United States Patent
Song et al.

(10) Patent No.: US 7,643,992 B2
(45) Date of Patent: Jan. 5, 2010

(54) METHOD, SYSTEM AND DEVICE FOR AUTOMATIC RECOGNITION OF LIMITED SPEECH

(75) Inventors: Yonggang Song, Shenzhen (CN); Chengdong Liu, Shenzhen (CN)

(73) Assignee: Huawei Technologies Co., Ltd., Guangdong, Province (CN)

( * ) Notice: Subject to any disclaimer, the term of this patent is extended or adjusted under 35 U.S.C. 154(b) by 498 days.

(21) Appl. No.: 11/567,138

(22) Filed: Dec. 5, 2006

(65) Prior Publication Data
US 2007/0165792 A1    Jul. 19, 2007

Related U.S. Application Data

(63) Continuation of application No. PCT/CN2006/002531, filed on Sep. 26, 2006.

(30) Foreign Application Priority Data
Sep. 29, 2005    (CN)    .................. 2005 1 0100150

(51) Int. Cl.
*G10L 15/00*    (2006.01)
*G10L 19/00*    (2006.01)
*G10L 21/00*    (2006.01)

(52) U.S. Cl. .................. 704/231; 704/201; 704/270; 379/457

(58) Field of Classification Search .................. None
See application file for complete search history.

(56) References Cited

U.S. PATENT DOCUMENTS

| 5,572,570 | A | 11/1996 | Kuenzig |
| 5,638,425 | A | 6/1997 | Meador, III et al. |
| 6,493,670 | B1 * | 12/2002 | Croft .................. 704/270 |

(Continued)

FOREIGN PATENT DOCUMENTS

CN    1489306 A    4/2004

(Continued)

OTHER PUBLICATIONS

Supplementary European Search Report of EP Application 06791120, dated Oct. 30, 2007, 4 pages.

(Continued)

*Primary Examiner*—David R Hudspeth
*Assistant Examiner*—Brian L Albertalli
(74) *Attorney, Agent, or Firm*—Townsend and Townsend and Crew, LLP

(57) ABSTRACT

This invention relates to a method of automatic recognition for limited speech and its correlative system and device. The main technical content is: Establish the relationship between the voice file and the identification information for a limited range of speech, and then insert the identification information into the voice file, or replace the content of the voice file with the identification information. After the transmitter sends the modified voice file, the receiver receives the modified voice and distinguishes the identification information in the voice. It then extracts the corresponding speech in the predetermined relationship using this identification information. The benefits of the embodiment of this invention include: a lower-cost method for automatically recognizing limited speech; high efficiency speech recognition, no need to wait for the voice file to finish to complete speech recognition; and lastly, a high recognition hit-rate or accuracy rate.

6 Claims, 3 Drawing Sheets

U.S. PATENT DOCUMENTS

| | | | |
|---|---|---|---|
| 6,650,662 B1 * | 11/2003 | Arnaud et al. | 370/526 |
| 6,823,302 B1 * | 11/2004 | Atkinson et al. | 704/216 |
| 2002/0077819 A1 * | 6/2002 | Girardo | 704/260 |
| 2005/0049858 A1 | 3/2005 | Busayapongchai | |
| 2005/0100121 A1 * | 5/2005 | Fouret et al. | 375/350 |
| 2007/0003031 A1 * | 1/2007 | Koulagi | 379/88.16 |

FOREIGN PATENT DOCUMENTS

JP      2004-226698 A      8/2004

OTHER PUBLICATIONS

International Application No. PCT/CN2006/002531, International Search Report and Written Opinion, 8 pages, Jan. 25, 2007.

* cited by examiner

METHOD, SYSTEM AND DEVICE FOR AUTOMATIC RECOGNITION OF LIMITED SPEECH

CROSS-REFERENCES TO RELATED APPLICATIONS

The present application is a continuation of PCT Application No. PCT/CN2006/002531, filed Sep. 26, 2006, which claims priority to Chinese Patent Application No. 200510100150.0, filed Sep. 29, 2005. All of these applications are commonly assigned and incorporated by reference herein for all purposes.

BACKGROUND OF THE INVENTION

This invention relates to a technology of speech recognition, more particularly, it relates to the method, system, device of transmitter and receiver, which can automatically recognize limited speech. It is used in intelligent voice telephone systems.

When testing a telecommunication product such as a Public Switched Telephony Network (PSTN) switch, SoftSwitch, Access Gateway (AG), etc., we need to verify those services which used intelligent voice, e.g., when you dial a wrong number, we will hear the voice prompt: "The number is incorrect, please check and dial again"; when we register a supplementary service, we will hear the voice prompt: "Welcome, your new service has been successfully registered, you may now use it", and so on. For most card-type services or computer-regulated services (that kept watch by computer), a voice prompt is widely used to provide a prompt or guidance for subsequent user operations. When manually testing a telecommunications product, voice prompts will be heard and verified by a human. But manual testing usually takes much more, and much of that work is repetitive work. Therefore, more and more voice services need to implement automatic testing. However, when automatic testing is implemented, how the machine or computer recognizes the voice prompts, becomes a major technical issue. This issue must be resolved to ensure the correctness and the integrity of the testing results. In this document, speech recognition means the recognition for the voice content.

One of the current technical schemes is Automatic Speech Recognition (ASR). The rationale is: first, convert voice to text; second, recognize the voice content by analyzing the text. The defect of this scheme is 1. the implementation process is complicated, and the implementation costs are high. 2 recognition speed of ASR is slow. As for most intelligent voice services, they require speech recognition to be achieved in a limited or short time, and the execution of follow-up dialing and other operations. Once timed out, intelligent voice services will not be executed according to the normal procedures. Therefore, from both a cost and performance standpoint, ASR technique is not suitable for telecommunication device speech recognition services.

The rationale of another current technical scheme is: from original voice file, generate voice templates that include the characteristic value of all voices, then load the templates; find the start and end point of the voice that being recognized, analyze and get the characteristic value between the start and the end point of the voice, compare the characteristic value of the voice being recognized with the characteristic value of voice templates, separate and analyze, and get the recognition results. The defect of this scheme is: 1. it requires a very high voice quality; if there is some voice distortion, the correctness of recognition will drop down visibly. 2. According to this scheme, when recognizing a voice, it is needed to get the characteristic value from the start to the end of the voice, that is to say, the recognition program can not start until the voice has finished. Therefore, recognition efficiency is lower.

BRIEF SUMMARY OF THE INVENTION

Addressing the above defects of the current technical schemes, this invention provides a method, system and device of automatic speech recognition, which leads to lower costs, higher efficiency and higher correctness; this technical scheme can be used for limited speech recognition.

In this invention, the technical scheme adopted to solve these technical problems is: designing a method of automatic recognition for limited speech, which includes the following steps:

The transmitter sends the voice file that needs to be played, which includes identification information;

The receiver receives the voice, distinguishes and gets valid identification information. Then, based on the valid identification information, searches the predetermined relationship table for the voice content;

The relationship table includes all the relationships between the voice content and identification information in the set of limited speech;

The identification information is inserted in the voice file, or replaces the content of the voice file.

The technical schemes below are the technical schemes that can be chosen.

The identification information includes basic identification code and boundary code; basic identification code is used for identifying the voice content, and boundary code is used for identifying the boundary of the basic identification code.

The boundary code is placed after the basic identification code.

The process of getting valid identification information includes:

The receiver receives identification information in the appointed time. When the receiver receives the total identification information in the appointed time, it checks the validity of the identification information; if validity checking fails, keep the basic identification code after the boundary code, and discard the previous basic identification code and boundary code. Continue the process of receiving identification information and validity checking until the validity checking passes or times out.

If validity checking passes, get the valid identification information; if it times out, perform the error process.

The boundary code is placed before the basic identification code.

The process of getting valid identification information includes:

In the appointed time, if the receiver receives the boundary code, then begin to receive basic identification code; if the receiver receives the total basic identification code, it checks the validity of the identification information. If validity checking fails, discard the identification information, and continue the process of receiving boundary code, basic identification code and validity checking, until the validity checking passes or times out.

If validity checking passes, get the valid identification information; if it times out, perform the error process.

The first boundary code is placed before the basic identification code, and the second boundary code is placed after the basic identification code.

The process of getting valid identification information includes:

In the appointed time, the receiver receives identification information. After receiving the first boundary code and the second boundary code, it checks the validity of the identification information; if validity checking fails, discard the identification information, and continue the process of receiving identification information and validity checking, until the validity checking passes or times out.

If validity checking passes, get the valid identification information; if it times out, perform the error process.

The identification information is a Dual Tone Multi-Frequency (DTMF) code in the technical scheme above.

This invention also provides the system of automatic recognition for limited speech, which includes a voice transmitter and voice receiver, a voice transmitter containing voice storage module and voice sending module, a voice receiver containing a relationship table storage module, identification information analysis module and search module;

Voice storage module: used for storing voice files, the corresponding identification information has been inserted in the voice files, or the audio content in the voice files have been replaced by the identification information.

Voice sending module: used for sending or playing the voice file in the voice storage module;

Relationship table storage module: used for storing the relationship table which relate to audio content and identification information.

Extraction module: used for analyzing and getting valid identification information from received voice, and sends the identification information to the search module;

Search module: used for searching voice content from relationship table according to the identification information from identification information analysis module;

This invention also provides a kind of voice transmitter device, which contains a voice storage module and voice send module;

Voice storage module: used for storing voice files, the corresponding identification information have been inserted in the voice files, or the audio contents in the voice files have been replaced by the identification information.

Voice sending module: used for sending or playing the voice file in the voice storage module;

This invention also provides a kind of voice receiver device, which contains a relationship table storage module, identification information analysis module and search module;

Relationship table storage module: used for storing the relationship table which relate to audio content and identification information.

Extraction module: used for analyzing and getting valid identification information from received voice, and sends the identification information to the search module;

Search module: used for searching voice content from the relationship table according to the identification information from the identification information analysis module;

The benefits of carrying out this automatic speech recognition method, system and device invention are as follows: a lower-cost method for automatically recognizing limited speech; achieving a high recognition hit-rate or accuracy by reducing signal distortion and enhancing the identification ability of terminals. Even if voice quality is not good enough, the device can recognize the speech accurately, and guarantee a high recognition hit-rate or accuracy.

DETAILED DESCRIPTION OF THE INVENTION

Figure 1:
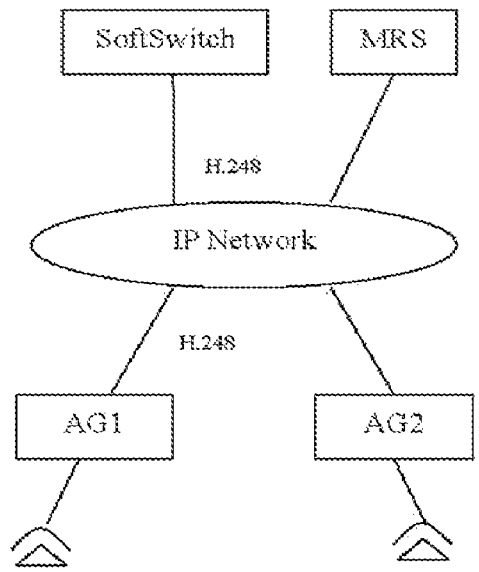
FIG. 1 is a schematic drawing of a Next Generation Network (NGN) networking architecture.

This invention provides a simple and applied method of speech recognition, which achieves high efficiency and high hit-rate or accuracy automatic recognition speech content with a limited range (which can be defined as fixed and certain lines of speech, rather than arbitrary speech);

The following describes one of the technical schemes of this invention according to FIG. 1.

FIG. 1 illustrates the basic networking architecture, in FIG. 1, the SoftSwitch is the switching and control center of the whole NGN network; SoftSwitch controls all the Access Gateway (AG) by the media gateway control protocol such as H.248, AG is used for accessing and connecting telephone users, which process packet handling of voice; Media Resource Server (MRS) is used for providing various media resources for users, for example, the voice prompts heard by users (e.g., "The line is busy now, please try again later") are played by the MRS, and transmitted to users through the Internet Protocol (IP) network. The recognition of limited speech in the embodiment of this invention, refers to the recognition of speech or voice played by the MRS. Since most voice contains multiple frequencies and other audio characteristics, it is difficult to perform a direct analysis of audio information characteristics of. It is needed to sufficiently simplify the speech characteristics being recognized so as to achieve simple and efficient speech recognition.

The detailed method of the embodiment in this invention is: modify the voice file in the MRS, insert the 4 Dual Tone Multi-Frequency (DTMF) identification code before the voice content in every voice file, when used for automatic speech recognition. During actual usage, only detect the DTMF number, then according to the predetermined relationship table, get the voice content. DTMF is a kind of number defined scheme, where every number contains two frequencies: a high frequency and a low frequency. The reason we select the DTMF number is, DTMF is a common standard for number definition, and can be detected and recognized by most instruments and devices. In addition, in the Voice over Internet Protocol (VoIP) network, and for the purpose of reducing DTMF distortion caused by a lost packet, jitter, etc., there are special protocols to ensure the transmission quality of the DTMF such as RFC2833, which can reduce DTMF distortion the most. At the same time, the main way to improve the recognition capability of voice terminals is to let the terminals do their best to adapt to DTMF distortion, which means the terminals support the flexible setting for tolerable offset of high frequency and low frequency DTMF numbers. By using DTMF to perform speech recognition, we can better adapt to poor quality network conditions, thereby improving the recognition hit-rate or accuracy rate.

The detailed embodiment method is described below:

1. Select voice file. Every voice item corresponding to a voice file, for example, the voice "The line is busy now, please try again later" corresponding to voice file HW0010006.chi. Find every voice file to be processed (we can get the relationship and original voice files from the documents provided in the products).

2. Define certain identification information (DTMF number) for every voice item. The minimum digit number for the identification information is determined by the number of voice items to be processed; if the number of voice items to be processed is less than 1000, the identification information digit number can be 3.

3. Modify voice files. According to the identification information defined for every voice item, edit and modify the original voice files with the voice edit tools, inserting corresponding DTMF numbers into the voice files. After all the voice files are modified as before, load the modified voice files to the MRS device. Thus, each time the MRS plays voice, the user will first hear the sound of four DTMF numbers.

During the application process, this scenario must be considered: if part of the voice file has already been played when voice recognition begins, then it is possible that part of the identification information before the starting point may have been lost. Normally, voice files are played circularly, so the identification information received may be composed of the last several digits of this playing cycle and the front several digits of the next playing cycle. For example, assume that the identification information of a voice item is defined as 103; then, in the situation above, the identification information received may be 310. In this way, the received identification information and the defined identification information for the voice items are not identical, thereby resulting in detection errors.

To avoid the errors above, the identification information may include a basic identification code and boundary code; the basic identification code is the DTMF code with a fixed digit number, which is necessary for identifying voice items and searching for voice content. The boundary code is a special DTMF code such as "#", which is used for identifying the boundaries of the basic identification codes; the boundary code is not the necessary information for searching for voice content. The basic identification code should not contain a boundary code. By this way, when the errors occurred because of cycle playing as above, we can get the correct identification code by the boundary code. The basic identification code and boundary code can be combined in three different ways: 1. basic identification code+boundary code; 2. boundary code+basic identification code; 3. first boundary code+basic identification code+second boundary code. When choosing which combination to use, choose the one which is most suitable to your specific need.

Figure 2:
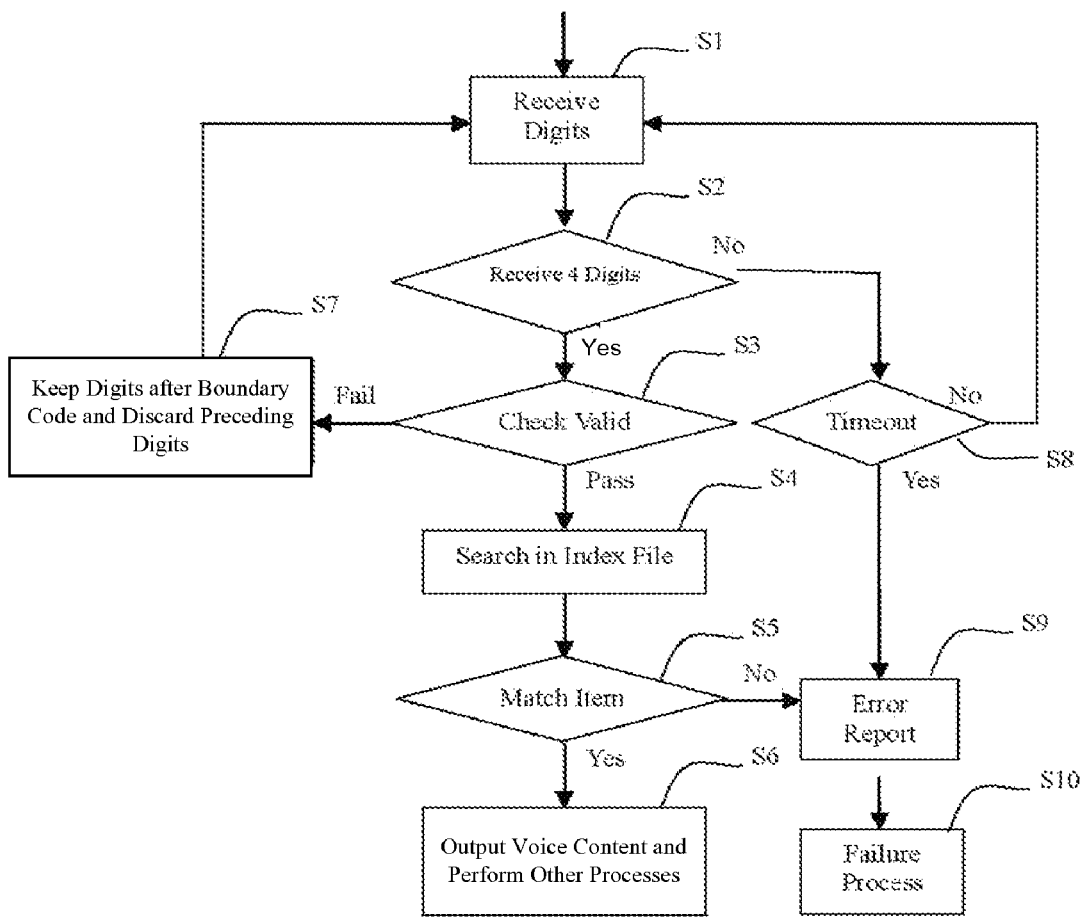
FIG. 2 is a flowchart which shows the first method of automatic recognition for limited speech to embody this invention.

FIG. 2 illustrates the flow of the first implementation method for automatic speech recognition; the identification information structure is "basic identification codes+boundary code", for example, for the voice item "The line is busy now, please try again later", the identification codes can be defined as "103#".

Because the purpose of this invention is to implement automatic testing, detecting and recognition for voice or speech, it must be implemented through the use of automatic tools. As an example in this invention, RealPhone is selected as the tool to perform speech recognition. RealPhone is a telephone emulation and control tool, which is based upon a Dialogic voice board. RealPhone provides all the functions of a telephone via a controlling voice board and includes the DTMF recognition function. Now what we need to do is: based on the function of DTMF recognition function, perform a special process for the predefined identification information.

First, define an index file for speech recognition, prescribe the corresponding relationship between identification information and voice item, that is, all the relationships between the identification information and voice items in the index file. In the simplest case, the content of the index file may be as follows:

001#: one; 002#: two; 003#: three; 004#: four; 005#: five; 006#: six; 007#: seven; 008#: eight; 009#: nine; 069#: year; 070#: month; 071#: day; 101#: Hello, it's time for you to wake up now; 103#: The line is busy now, please try again later; 107#: The number is incorrect, please check and dial again; 108#: Sorry, the number you dialed does not exist, please check and dial again; 111#: Welcome, your new service has been successfully registered, enjoy; 113#: Sorry, you have not paid your telephone service; 114#: Sorry, your call is restricted; 115#: [Music]; 119#: The callee is busy now, please try again later; 124#: The subscriber you are calling is out of service; 128#: At the sound of the beep, Beijing time is . . . etc.

During actual usage, the index file can be edited as needed. According to a prescribed format, you may also add some other information to it. For example, the index file can be composed of three types of relationship table information: identification information, voice content items and remarks, as well as other information.

When using the structure of identification information as "basic identification+boundary code", the detailed process flow of speech recognition is illustrated by FIG. 2.

S1. Receive DTMF identification code, then, execute step S2;

S2. Analyze and determine the DTMF digit number received is sufficient or not, if the identification number received is sufficient, execute step S3; if the digit number is not complete, execute step S8;

S3. Check the validity of the received DTMF identification code, if the rule of the identification code is valid, execute step S4; and if the rule of the identification code is invalid, execute step S7;

S4. Search the voice content text corresponding to the identification code in the index file, then execute step S5;

S5. Analyze and determine if there is a matched item or not, if a matched item is found, execute step S6, otherwise, execute step S9;

S6. Output the voice content text, and perform correlative processing;

S7. Keep the identification codes after the boundary code, and discard the front codes, return to the step S1;

S8. Analyze and decide if there is a timeout or not, if there is a timeout, execute step S9; otherwise, return to step S1;

S9. Perform error report processing; then execute step S10;

S10. Perform failure processing.

In the abovementioned steps, you only need to receive 4 DTMF codes; after receiving 4 DTMF codes, check its validity, confirm the last code is the boundary code such as "#", and the front 3 codes are all numeral code. After the validation checking is passed, search the index file immediately using the 4 identification codes received, find and output the corresponding voice content text, and perform the latter processing according to the actual testing needs. For example, if the 4 DTMF codes received is "3#10", not "103#", then the last code is not the boundary code "#", the validation checking will not be passed. At this time, discard the boundary code and the front codes before it and keep the latter codes, namely "10". Then continue receiving DTMF codes until you receive valid identification codes. Through the above processing, we can see that usually we can recognize the voice immediately, just by receiving the identification codes in front of the voice, and there is no need to wait for voice to finish playing. This is a very effective way to improve voice recognition efficiency when performing a great deal of testing.

Figure 3:
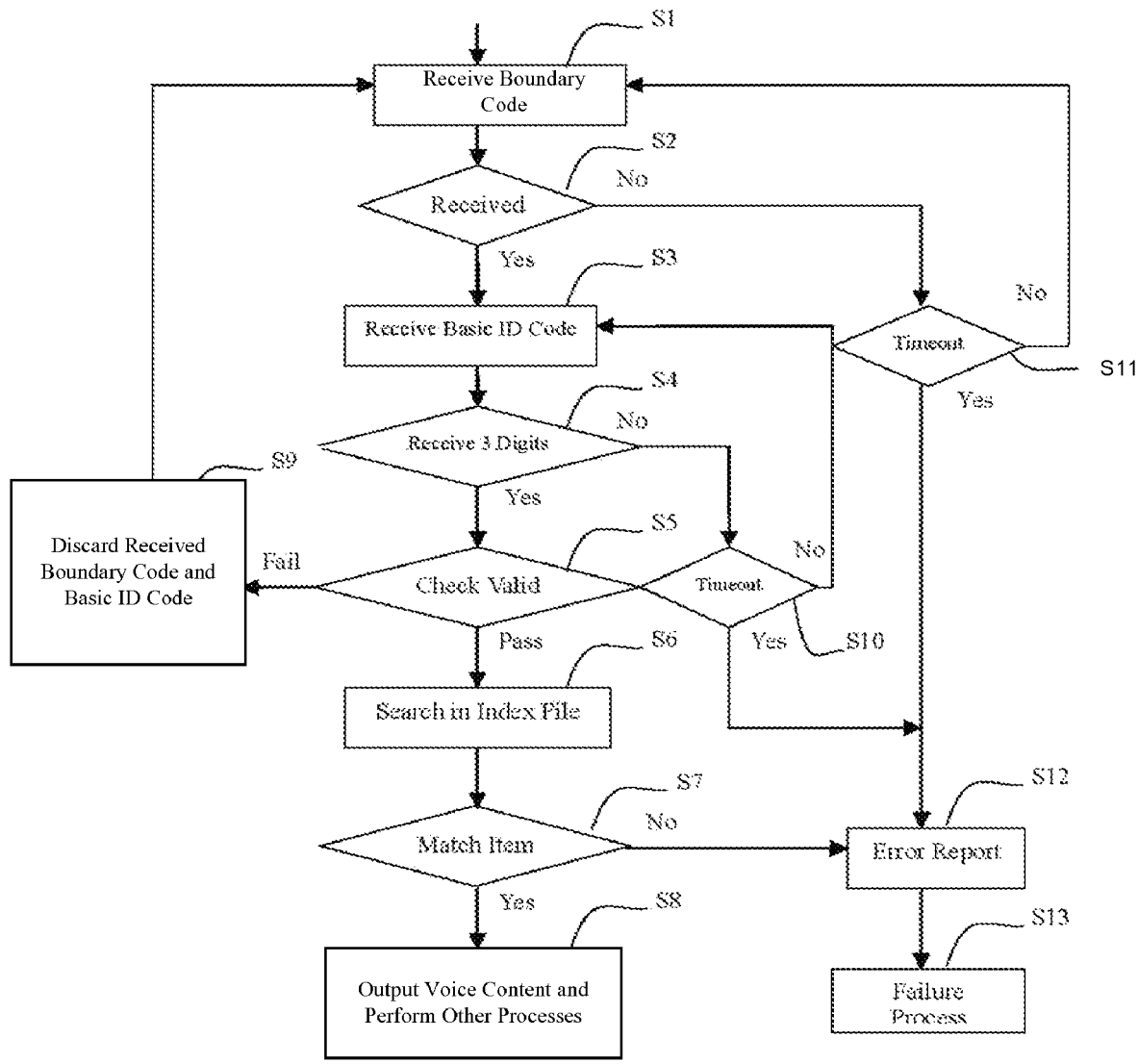
FIG. 3 is a flowchart which shows the second method of automatic recognition for limited speech to embody this invention.

FIG. 3 illustrates the flow of the second implementation method of automatic speech recognition, the identification information structure is "boundary code+basic identification codes"; for example, for the voice item "The line is busy now, please try again later", the identification codes can be defined as "#103". The detailed flow is as follows:

S1. Receive boundary code;

S2. Analyze and determine whether the boundary code has been received; if received, execute step S3, otherwise execute step S11;

S3. Receive basic identification codes, execute step S4;

S4. Analyze and decide whether all the 3 basic identification codes have been received; if yes, execute step S5; otherwise execute step S10;

S5. Check the validity, if passed, then execute step S6; otherwise, execute step S9;

S6. Search the voice content text matching the identification code in the index file, then execute step S7;

S7. Analyze and decide if there is a matched item or not, if a matched item is found, execute step S8; otherwise, execute step S12;

S8. Output the voice content, and perform correlative processing;

S9. Discard the boundary code and basic identification codes received, and then return to step S1;

S10. Analyze and decide if there is a timeout or not; if there is a timeout, execute step S12; otherwise, return to step S3;

S11. Analyze and decide if there is a timeout or not; if there is a timeout, execute step S12; otherwise, return to step S1;

S12. Perform error report processing; then execute step S13;

S13. Perform failure processing.

For the second mode of automatic speech recognition, receiving the boundary code is regarded as the condition which will trigger the latter processing of receiving basic identification codes. Then, voice recognition processing is simplified.

Figure 4:
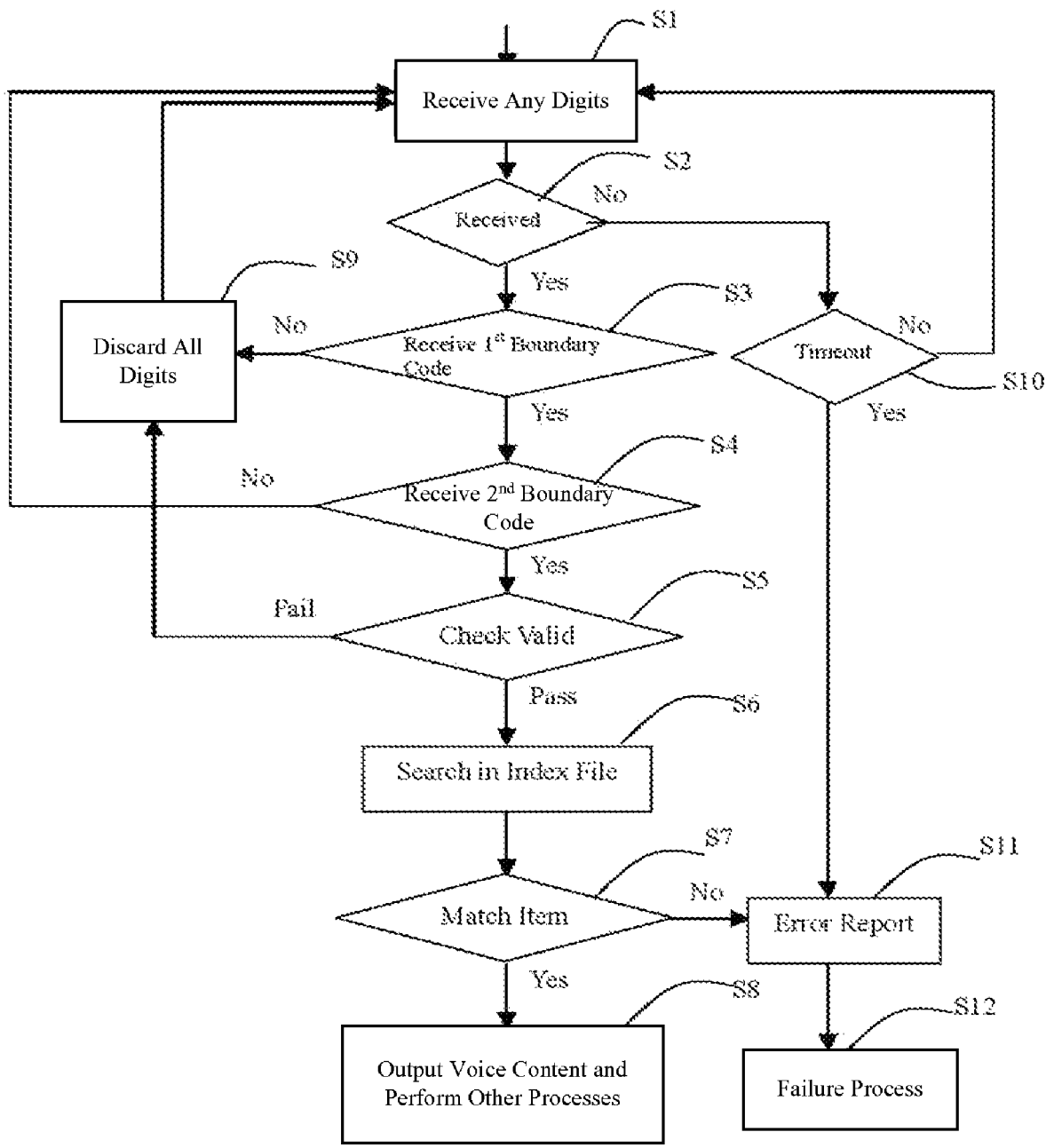
FIG. 4 is a flowchart which shows the third method of automatic recognition for limited speech to embody this invention.

FIG. 4 illustrates the flow of the third implementation method of automatic speech recognition, the identification information structure is "first boundary code+basic identification codes+second boundary code"; for example, for the voice item "The line is busy now, please try again later", the identification codes can be defined as "***103#". This mode does not restrict the length of basic identification codes, and facilitates the expansion of the voice recognition processing procedure. The detailed flow is as follows:

S1. Receive and store any DTMF identification code, then, execute step S2;

S2. Analyze and decide if any DTMF code is received; if yes, then execute step S3; otherwise, execute step S10;

S3. Analyze and decide if first boundary code has been received or not, if received, execute step S4; otherwise, execute the step S9;

S4. Analyze and decide if second boundary code has been received or not; if received, execute step S5; otherwise, return to step S1;

S5. Check the validity of the received identification information; if validation is passed, then execute the step S6; otherwise, execute the step S9;

S6. Search the voice content matching the identification code in the index file, then execute step S7;

S7. Analyze and decide if there is a matched item or not; if a matched item is found, execute step S8, otherwise, execute step S11;

S8. Output the voice content, and perform correlative processing;

S9. Discard all the codes received, return to step S1;

S10. Analyze and decide if there is a timeout or not; if no timeout, return to step S1; if there is a timeout, execute step S11;

S11. Perform error report processing; then execute step S12;

S12. Perform failure processing.

There are other embodiment modes for this invention, for example, the voice recognition terminal is not restricted to RealPhone or a voice board; it can be other recognition tools. This invention is not restricted to only adopting a DTMF numbers as identification codes in order to perform voice recognition processing. During practical application, if restricted by some conditions or some other special requirements, other appointed single frequency signals can also be adopted as identification codes, such as single frequency, Multi-Frequency (MF), or user-defined frequency signals.

As for an absolute automatic test environment, in cases where manual operation does not need to considered, the voice content can also be completely replaced by identification codes. The advantages of this mode are as follows: 1. It can improve the average speed of voice recognition, that is, if the recognition processing does not start at the beginning of the voice, it does not need to wait long time for the voice file to finish playing; 2. Reduce the labor of editing and clipping the voice file; moreover, the voice files which only contain DTMF can be generated automatically with program tools; 3. Avoid error recognition in situations where the frequency in the voice content approaches the frequency of DTMF.

If the MRS supports two voice systems simultaneity, that is, you can load two series of voice files to the MRS: one series of voice files is the original, the other series of voice files contain identification codes. The MRS also provides switch command for control. In this situation, the technical scheme of this invention can be conveniently applied to automatic testing and manual testing.

The following describes the system and devices of automatic recognition for limited speech provided by this invention.

The system of automatic recognition for limited speech of this invention includes, voice transmitter and voice receiver, voice transmitter containing voice storage module and voice sending module, voice receiver containing a relationship table storage module, identification information analysis module and search module;

The voice storage module is used for storing voice information. The voice information in the voice storage module can be expressed in a file format, which means there are many voice files stored in the voice storage module. Every voice file is inserted into the corresponding identification information or, the voice content in voice file is replaced by the identification information. The identification information is comprised of the identification codes described above; the identification codes in the voice file can be DTMF numbers, appointed single frequency signals, MF numbers, or user-defined frequency signals, etc. The identification information can include basic identification code and boundary code, which can be expressed in the following combination modes: 1. basic identification code+boundary code; 2. boundary code+basic identification code; 3. first boundary code+basic identification code+second boundary code. The detailed process has already been described above.

The voice sending module is used for sending or playing the voice file in the voice storage module according to the voice service requirements. The voice files in the voice storage module contain identification codes.

The relationship table storage module is used for storing the relationship table which correlates to the audio content and identification information.

The identification information analysis module is used for analyzing and getting valid identification information from the received voice. It then sends the identification information to the search module. If the mode of identification information in the voice files is different, the processing of identification information analysis module is different too. The detailed process for analyzing and getting valid identification information has already been described above. The identification information analysis module can just send basic identification code to the search module, or it can also send both boundary code and basic identification code to the search module.

The search module is used to search for voice content from the relationship table storage module according to the identification information that has been received. The detailed process has already been described above.

What is claimed is:

1. A method for automatic recognition of a speech with a limited range, the method comprising:
    a transmitter sending a voice file including identification information;
    a receiver receiving the voice file, extracting effective identification information and searching for corresponding voice content from a preset corresponding relationship based upon the extracted effective identification information;
    said corresponding relationship being a corresponding relationship between a limited set of voice content and identification information;
    said identification information being inserted into the voice file or said identification information replaces audio information in the voice file; wherein:
    said identification information includes a basic identification code and a boundary code, the basic identification code being used to label the voice content, the boundary code being used to label a boundary of the basic identification code;
    said boundary code is located after said basic identification code; and
    the extracting effective identification information comprises:
        the receiver receiving the identification information within a preset time interval and performing a validity test after the receiver receives a full bit set of the identification information within said preset time interval, when the test fails, retaining the basic identification code after the boundary code, discarding the basic identification code before the boundary code, and continuing said processes of receiving the identification information and performing a validity test until the validity test passes or a timeout occurs;
        when the test passes, extracting the effective identification information; when the timeout occurs, performing an error process.

2. A method for automatic recognition of a speech with a limited range, the method comprising:
    a transmitter sending a voice file including identification information;
    a receiver receiving the voice file, extracting effective identification information and searching for corresponding voice content from a preset corresponding relationship based upon the extracted effective identification information;
    said corresponding relationship being a corresponding relationship of a limited set between voice content and identification information;
    said identification information being inserted into the voice file or said identification information replacing audio information in the voice file; wherein:
    said identification information includes a basic identification code and a boundary code, the basic identification code being used to label the voice content, the boundary code being used to label a boundary of the basic identification code;
    said boundary code is located before said identification code; and
    the extracting effective identification information specifically comprises:
        within a preset time interval, after the receiver receives the boundary code, the receiver receiving the basic identification code; after receiving a full bit set of the basic identification code, performing a validity test; if the validity test fails, discarding the received basic identification code and continuing said processes of receiving the boundary code and the basic identification code and performing a validity test until the validity test passes or a timeout occurs;
        when the validity test passes, extracting the effective identification information; when the timeout occurs, performing an error process.

3. A method for automatic recognition of a speech with a limited range, the method comprising:
    a transmitter sending a voice file including identification information;
    a receiver receiving the voice file, extracting effective identification information and searching for corresponding voice content from a preset corresponding relationship based upon the extracted effective identification information;
    said corresponding relationship being a corresponding relationship between a limited set of voice content and identification information;
    said identification information being inserted into the voice file or said identification information replaces audio information in the voice file; wherein:
    said identification information includes a basic identification code and a boundary code, the basic identification code being used to label the voice content, the boundary code being used to label a boundary of the basic identification code;
    said identification information characterized by a first boundary code located before said basic identification code and a second boundary code located after said basic identification code; and
    the extracting effective identification information specifically comprises:
        within a preset interval, the receiver receiving the identification information; after receiving the first boundary code and second boundary code, performing a validity test; if the validity test fails, discarding the received identification information and continuing said processes of receiving the identification information and performing a validity test until the validity test passes or a timeout occurs;
        when the test passes, extracting the effective identification information; when the timeout occurs, performing an error process.

4. The method according to claim 1, wherein said identification information is a DTMF identification number.

5. A system for automatic recognition of a speech with a limited range, comprising a voice transmitter and a voice receiver, wherein the transmitter includes a voice storage module and a voice transmission module, and the voice receiver includes a corresponding relationship storage module, an extraction module and a search module;

the voice storage module: used to store a voice file, said voice file being inserted with corresponding identification information or the audio information in the voice file being replaced with the identification information;

the voice transmission module: used to send the voice file stored in the voice storage module;

the corresponding relationship storage module: used to store a corresponding relationship between said voice content and identification information;

the extraction module: used to extract effective identification information from the received voice file and transfer it to the search module;

the search module: used to search for the voice content from said corresponding relationship based upon said received identification information;

wherein said identification information includes a basic identification code and a boundary code, the basic identification code being used to label the voice content, the boundary code being used to label a boundary of the basic identification code;

if said boundary code is located after said basic identification code, the receiver is configured to receive the identification information within a preset time interval and perform a validity test after the receiver receives a full bit set of the identification information within said preset time interval, when the test fails, retain the basic identification code after the boundary code, discard the basic identification code before the boundary code, and continue said processes of receiving the identification information and perform a validity test until the test passes or a timeout occurs; when the test passes, extract the effective identification information; when the timeout occurs, perform an error process;

if said boundary code is located before said identification code, within a preset time interval, after the receiver receives the boundary code, the receiver is configured to receive the basic identification code; after receiving a full bit set of the basic identification code, perform a validity test; if the test fails, discard the received basic identification code and continue said processes of receiving the boundary code and the basic identification code and perform a validity test until the test passes or a timeout occurs; when the test passes, extract the effective identification information; when the timeout occurs, perform an error process; or if said identification information characterized by a first boundary code located before said basic identification code and a second boundary code located after said basic identification code, within a preset time interval, the receiver is configured to receive the identification information; after receiving the first boundary code and second boundary code, perform a validity test; if the test fails, discard the received identification information and continue said processes of receiving the identification information and perform a validity test until the test passes or a timeout occurs; when the test passes, extract the effective identification information; when the timeout occurs, perform an error process.

6. A type of voice receiver device, wherein said voice receiver device includes a corresponding relationship storage module, an extraction module and a search module;

the corresponding relationship storage module: used to store a corresponding relationship between said voice content and identification information;

the extraction module: used to extract effective identification information from the received voice file and transfer it to the search module;

the search module: used to search for the voice content from said corresponding relationship based upon said received identification information;

wherein said identification information includes a basic identification code and a boundary code, the basic identification code being used to label the voice content, the boundary code being used to label a boundary of the basic identification code;

if said boundary code is located after said basic identification code, the receiver is configured to receive the identification information within a preset time interval and perform a validity test after the receiver receives a full bit set of the identification information within said preset time interval, when the validity test fails, retain the basic identification code after the boundary code, discard the basic identification code before the boundary code, and continue said processes of receiving the identification information and perform a validity test until the validity test passes or a timeout occurs; when the test passes, extract the effective identification information; when the timeout occurs, perform an error process;

if said boundary code is located before said identification code, within a preset time interval, after the receiver receives the boundary code, the receiver is configured to receive the basic identification code; after receiving a full bit set of the basic identification code, perform a validity test; if the validity test fails, discard the received basic identification code and continue said processes of receiving the boundary code and the basic identification code and perform a validity test until the validity test passes or a timeout occurs; when the test passes, extract the effective identification information; when the timeout occurs, perform an error process; or if said identification information characterized by a first boundary code located before said basic identification code and a second boundary code located after said basic identification code, within a preset time interval, the receiver is configured to receive the identification information; after receiving the first boundary code and second boundary code, perform a validity test; if the validity test fails, discard the received identification information and continue said processes of receiving the identification information and perform a validity test until the test passes or a timeout occurs; when the validity test passes, extract the effective identification information; when the timeout occurs, perform an error process.

* * * * *

UNITED STATES PATENT AND TRADEMARK OFFICE
CERTIFICATE OF CORRECTION

PATENT NO. : 7,643,992 B2
APPLICATION NO. : 11/567138
DATED : January 5, 2010
INVENTOR(S) : Song et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 529 days.

Signed and Sealed this

Sixteenth Day of November, 2010

David J. Kappos
*Director of the United States Patent and Trademark Office*